United States Patent
Engstrom et al.

(10) Patent No.: US 7,212,808 B2
(45) Date of Patent: May 1, 2007

(54) UNIFIED MESSAGE BOX FOR WIRELESS MOBILE COMMUNICATION DEVICES

(75) Inventors: G. Eric Engstrom, Kirkland, WA (US); Tyrol R. Graham, Seattle, WA (US); Jonathan O. Nelson, Kirkland, WA (US); Eric J. Hull, Seattle, WA (US)

(73) Assignee: Wildseed Ltd., Seattle, WA (US)

(*) Notice: Subject to any disclaimer, the term of this patent is extended or adjusted under 35 U.S.C. 154(b) by 621 days.

(21) Appl. No.: 10/687,511

(22) Filed: Oct. 15, 2003

(65) Prior Publication Data

US 2004/0137955 A1 Jul. 15, 2004

Related U.S. Application Data

(60) Provisional application No. 60/418,764, filed on Oct. 15, 2002.

(51) Int. Cl.
*H04Q 7/22* (2006.01)
*H04B 1/38* (2006.01)
*H04M 1/56* (2006.01)

(52) U.S. Cl. .................. 455/412.1; 455/413; 455/414.1; 455/566; 379/142.01; 379/88.21

(58) Field of Classification Search ............. 455/550.1, 455/556, 466, 414.1, 412.1, 567, 458, 412, 455/412.2, 566, 413; 379/88.21, 142.01
See application file for complete search history.

(56) References Cited

U.S. PATENT DOCUMENTS

| | | | |
|---|---|---|---|
| 5,946,636 A * | 8/1999 | Uyeno et al. | 455/566 |
| 5,966,663 A * | 10/1999 | Gleason | 455/466 |
| 6,404,762 B1 | 6/2002 | Luzeski et al. | |
| 6,430,177 B1 | 8/2002 | Luzeski et al. | |
| 6,661,877 B1 | 12/2003 | Lee et al. | |
| 6,671,356 B2 | 12/2003 | Lewis | |
| 6,754,316 B2 * | 6/2004 | Kafri | 379/93.23 |
| 6,763,095 B1 * | 7/2004 | Cermak et al. | 379/93.23 |
| 6,772,143 B2 | 8/2004 | Hung | |
| 7,039,428 B1 * | 5/2006 | Helferich | 455/458 |
| 2004/0137884 A1 * | 7/2004 | Engstrom et al. | 455/414.1 |

\* cited by examiner

*Primary Examiner*—Tilahun Gesesse
(74) *Attorney, Agent, or Firm*—Schwabe, Williamson & Wyatt P.C.

(57) ABSTRACT

A mobile communication device, such as a wireless mobile phone, is provided with a unified message function equipped to facilitate a user in interacting with communication messages of different message types supported by the mobile communication device via an unified message box.

17 Claims, 5 Drawing Sheets

| | MT | Subject | Date | Time |
|---|---|---|---|---|
| ☺ | E | Conference Events | 10/15/02 | 3:17am |
| ☻ | T | Hey, What's up? Call ... | 10/15/02 | 5:35am |
| ♀ | V | 555-555-2121 | 10/15/02 | 9:45am |
| ♂ | T | Did you get my email? I need input. | 10/15/02 | 11:15am |
| ☺ | MC | 555-555-1212 | 10/15/02 | 12:27pm |
| ? | MC | 555-555-1212 | 10/15/02 | 4:09pm |
| ? | | | | |

UNIFIED MESSAGE BOX FOR WIRELESS MOBILE COMMUNICATION DEVICES

RELATED APPLICATION

The present application claims priority to Provisional Application No. 60/418,764, filed Oct. 15, 2002 entitled "Single Stack for Calls and Messages for Wireless Mobile Devices", the specification of which is hereby fully incorporated by reference.

FIELD OF THE INVENTION

The present invention pertains to the field of wireless mobile communication. More particularly, the present invention relates to a single message stack/box for communication messages of different message types for wireless mobile communication devices.

BACKGROUND OF THE INVENTION

Since their introduction, the capabilities and the number of services and features for wireless mobile phones (also referred to as cellular telephones) have steadily increased while the cost of ownership and operation has decreased. At first, these wireless mobile phones (WMP) operated on analog wireless networks that enabled voice communication and simple paging features. Later, digital wireless networks were introduced for WMP to provide more advanced features for voice and data communication, such as encryption, caller identification, and transmitting and receiving email and short message service (SMS) text messages.

Some WMP also incorporate many of the features originally provided for in handheld electronic devices, such as personal digital assistants (PDAs). Relatively simple PDA features such as keeping a list of contacts, a calendar, appointments, and the like have been generally integrated into recent cellular telephone models, blurring the distinction between WMP and PDAs.

User interfaces for wireless mobile devices are inherently limited by the size of the devices, often times using a standard 12-key keypad and/or a touch pad in conjunction with a fairly small display. These interfaces are often menu driven. Typical top menu items include "messages", "call log", "profile", "setting", and so forth. Each of the top menu items may include one or more layers of sub-menu items. For example, sub-menu items under "messages" may include "voice mails", "text messages", "emails," and so forth. Sub-menus under "text messages" or "email" may include an "inbox" and an "outbox." At each menu level, menu items are often navigated in a predetermined round robin order. From a sub-menu level, a user often has to back track one or more levels before being able to navigate into another sub-menu.

With these kinds of typical interfaces, a user typically has to navigate in and out, and back and forth among many menus and sub-menus, due to the variety of communication services available, and the different formats the various come in.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION OF ILLUSTRATIVE EMBODIMENTS

In the following detailed description, numerous specific details are set forth in order to provide a thorough understanding of the embodiments of the present invention. However, those skilled in the art will understand that other embodiments may be practiced without these specific details, and that the present invention is not limited to the depicted embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful for understanding the illustrative embodiments. However, the order of description should not be construed as to imply that these operations are necessarily performed in the order they are presented, nor even order dependent. Lastly, repeated usage of the phrase "in one embodiment" does not necessarily refer to the same embodiment, although it may.

Figure 1:
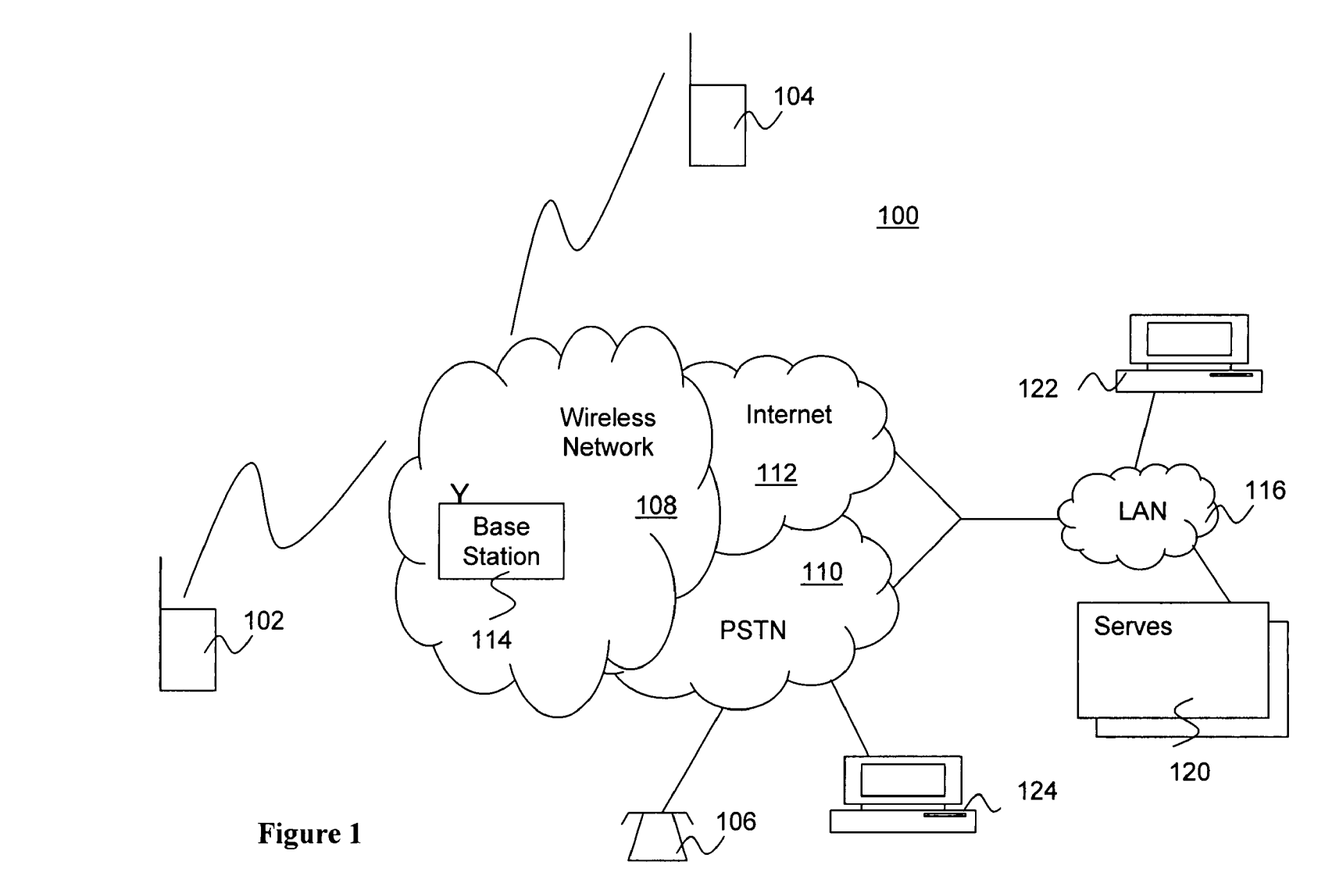
FIG. 1 illustrates an example communication environment suitable for practicing the present invention, in accordance with one embodiment.

FIG. 1 illustrates an example communication environment suitable for practicing the present invention, in accordance with one embodiment. As illustrated, a user of a wireless mobile phone (WMP) 102 in environment 100 may place and/or receive calls (and/or voice mails) to and from another WMP user, such as user of WMP 104, or another line based handset user, such as user of handset 106, via wireless networks 108, PSTN 110, and/or Internet 112, through which WMP 102 and 104 and handset 106 are communicatively coupled. User of WMP 102 may also send and receive text and/or email messages to and from another WMP user, such as user of WMP 104, or another line based computer user, such as users of computers 122–124, via the same wireless networks 108, PSTN 110, Internet 112, and/or LAN 116. LAN 116 may include server 120 providing various services, such as email services.

Resultantly, WMP 102/104 may receive messages of different message formats, including but are not limited to voice mails, missed call notifications, emails, text messages and so forth, from different communication partners. Embodiments of the present invention provide a single stack or message box for messages in multiple message formats. For instance, rather than having one inbox for calls received, another inbox for voice mail, another inbox for email, and yet another inbox for text messages, embodiments of the present invention list two or more types (e.g. all types) of incoming messages in a single inbox. Other embodiments can similarly list two or more types (e.g. all types) of outgoing messages in a single outbox. Yet other embodiments may list two or more types (e.g. all types) of incoming/outgoing messages in a single message box.

Before describing embodiments of the present invention further, it should be noted that the present invention is not limited to call, voice mail, email, and text messaging, but may instead be applied to virtually any messaging format currently available or introduced in the future.

Still referring to FIG. 1, wireless networks 108 refer to the wireless service networks of wireless telephone service providers, such as the wireless service networks offered by companies like AT&T Wireless of Redmond, Wash., Sprint of Overland Park, Kans., and so forth. Wireless networks 108 include base stations, such as base station 114, switches/routers (not shown), and so forth. PSTN 110 refers to the traditional circuit switched network of line based telephone services, such as the line circuits operated by Qwest of Denver, Colo., Bell South of Atlanta, Ga., and so forth. Internet 112 refers to the famous packet based networking backbone inter-networking private and public networks, such as intranet 116 of wireless service provider 130.

Figure 2:
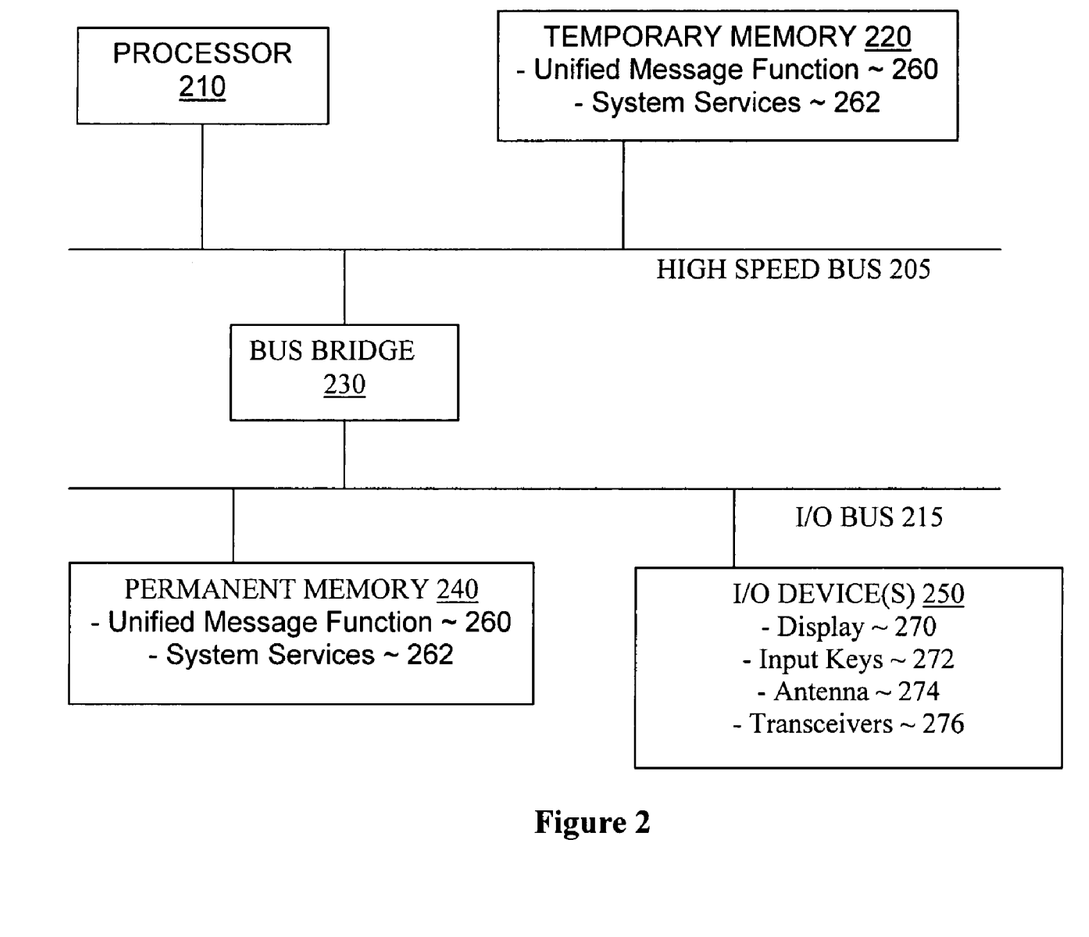
FIG. 2 illustrates one embodiment of a hardware system to implement embodiments of the present invention.

FIG. 2 illustrates one embodiment of a hardware system suitable for use to implement WMP 102/104, in accordance with one embodiment. In the illustrated embodiment, the hardware system includes processor 210 coupled to high speed bus 205, which is coupled to input/output (I/O) bus 215 through bus bridge 230. Temporary memory 220 is coupled to bus 205. Permanent memory 240 is coupled to bus 215. I/O device(s) 250 is also coupled to bus 215.

Temporary memory 220 and permanent memory 240 include in particular a transient copy and a persistent copy of unified message function 260 respectively, to be described more fully below. For the embodiment, temporary memory 220 and permanent memory 240 further include a transient copy and a persistent copy of system services 262 respectively. System services 262 represent a broad range of system services, including but are not limited to memory management, task management, interrupt/exception processing, graphics services, device services, and so forth.

I/O device(s) 250 may include a display device 270, a keypad 272 (including alphanumeric keys, and e.g. a scroll key), an antenna 274, radio frequency transponder or transceiver 276, and so forth. Transceiver 276 together with its device services may be equipped enable access to several types of communication services including global system for mobile (GSM) voice communications, short message service (SMS) text messaging, simple mail transfer protocol (SMTP) email, and the like. Each type of service may use its own communications format, storage format, user presentation format, as well as response format.

In various embodiments, WMP 102/104 may also include one or more external accessory interfaces, to facilitate coupling of an intelligent accessory, e.g. an intelligent interchangeable accessory cover, to enhance or customize the functions of WMP 102/104. Customizing or further enriching the functionalities of a mobile communication device is the subject matter of co-pending U.S. patent application Ser. No. 10/087,098, filed on Mar. 1, 2002, and entitled "PERSONALIZING ELECTRONIC DEVICES AND SMART COVERING", which specification is hereby incorporated by reference (for U.S. version of the present application).

Certain embodiments may include additional components, may not require all of the above components, or may combine one or more components. For instance, temporary memory 220 may be on-chip with processor 210. Alternately, permanent memory 240 may be eliminated and temporary memory 220 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Those skilled in the art will be familiar with a variety of alternate internal networks including, for instance, an internal network based on a high speed system bus with a memory controller hub and an I/O controller hub. Additional components may include additional processors, digital signal processors (DSPs), additional memories, and other peripheral components known in the art.

Figure 3:
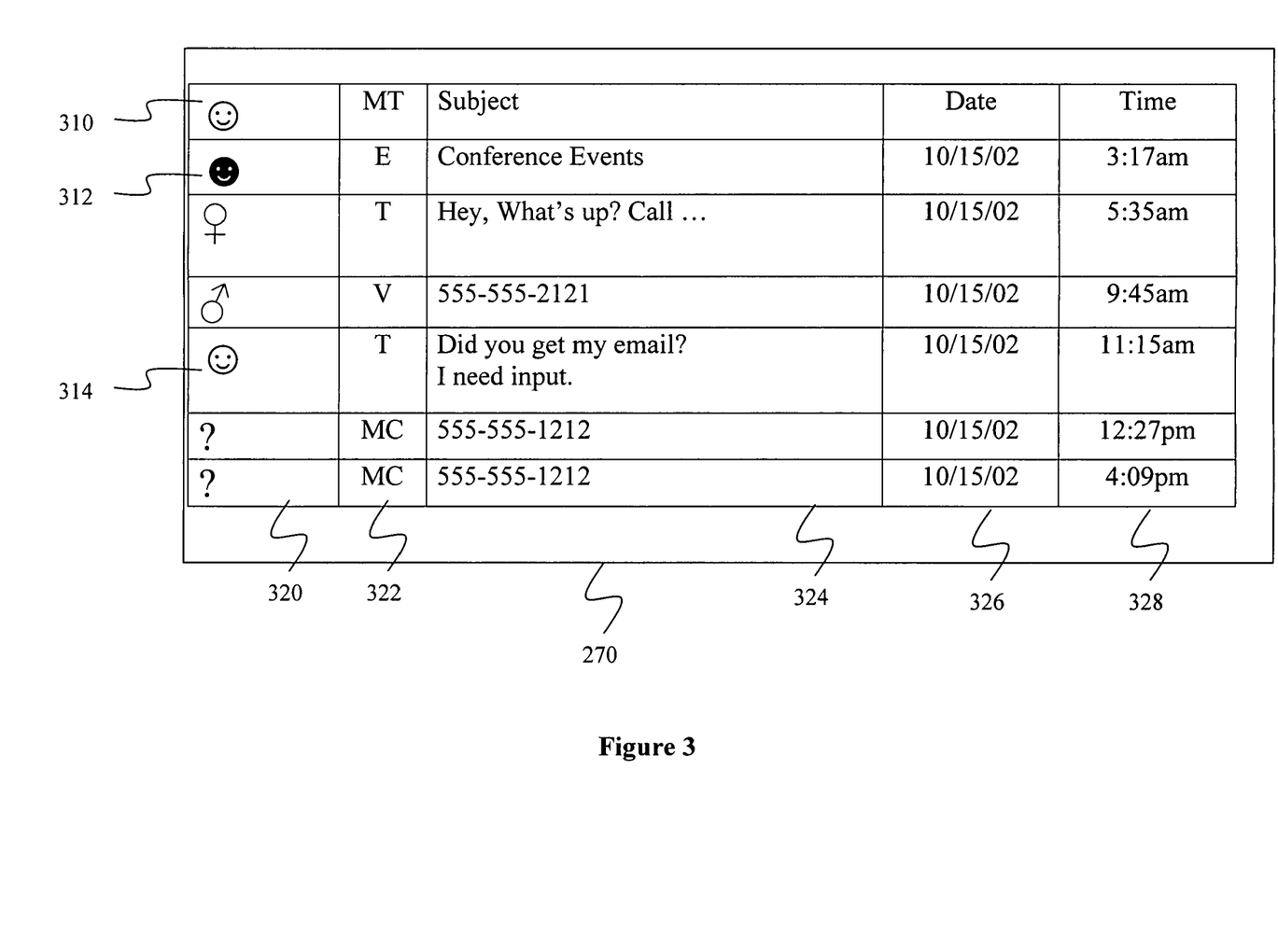
FIG. 3 illustrates one embodiment of a user interface for embodiments of the present invention.

FIG. 3 illustrates an end user interface of unified message function 260 suitable for use to implement WMP 102/104, in accordance to one embodiment. As alluded to earlier, user interface 110 provides a unified message box for messages of multiple formats, e.g. all message formats, to enable a user of WMP 102/104 not having to go through separate inboxes for voice mail notices, missed calls identifiers, email messages, and text messages. In other words, voice mail notifications, text messages, and/or emails, etc., may all be listed together in the unified message box. Accordingly, a user remembering receiving a message from a particular person, need not remembers if the message was voice mail, email, a text message, etc, nor having to go through multiple stacks/boxes to look for the message.

For the embodiment, the unified message stack or box is displayed on a screen 270. For instance, the screen 270 may be a liquid crystal display (LCD) on a WMP. Any number of other display devices may be used.

Column 320 identifies the sender/caller using an icon or a digital image. The icon or digital image may be retrieved from e.g. a contact record. Messages associated with a particular contact may be marked with the corresponding icon to conveniently recognize the contact. Messages 310 and 312 are from the same contact, as indicated by the same icon used for both messages. Near the bottom of the screen 270, two unknown senders/callers are listed with a question mark icon.

Column 322 identifies the message type. Going down the column, the messages are an email, a text message, a voice mail, another text message, and two missed calls.

Column 324 is the subject column. Depending on the type of message, different information is added to the subject column. For emails, the subject line of the email header is displayed up to a certain number of characters. For text messages, the messages are usually short, so the message itself is displayed up to a certain number of characters. For text message 312, the message is too long to display on one line, as indicated by the training periods. Text message 314 is also too long to fit on one line. However, in the illustrated embodiment, when a text message is highlighted, the subject line is automatically extended up to a certain number of lines. If the entire text of the message is still too long, a command can be used to open the message in the same fashion that an email message can be opened.

Column 326 is the date received and column 328 is the time received. Emails and text messages may not be received at the time and day as they are sent. In which case, other embodiments may display the date and time sent for emails and/or text messages.

In the illustrated embodiment, there may be additional messages listed above and below the messages currently shown on screen 270. A user may scroll to the additional message using e.g. a scroll key of the WMP.

As discussed above, a unified interface may be used for all of the messages. For instance, open, delete, and reply commands can be used for any of the messages by highlighting a particular message and enter the appropriate command.

FIG. 3 illustrates a number of implementation specific details. Other embodiments may not include all of the illustrated fields, may arrange the fields differently, may include additional fields, may provide for different types of interaction with messages, may provide for interaction with messages in different ways, etc.

In one embodiment, the messages are simply listed in the chronological order in which they were received. In other embodiments, unified message function 260 may include support for the user to change the order in which all of the messages are listed. For instance, a user may be able to list messages in reverse chronological order, as well as based on whether or not the messages have been read, who the sender is, the type of messaging service used (voicemail, email, SMS message, etc.), and the like.

In one embodiment, WMP 102/104 may also be equipped to maintain contact records. Each contact record may include identifying information for a particular contact, or group of contacts, including, for instance, phone number(s), email address(es), Internet Protocol (IP) addresses, and the like. When a message is received, regardless of the messaging protocol used, information is filtered from the message to identify the sender, if possible. For instance, an email will include the email address of the sender. A text message may include an IP address. If caller ID is available, a voice mail notification or a missed call notification may include the name and/or telephone number of the caller. The identifying information is compared to the contact records. If a match is found, the message is associated with that contact. So, for instance, all messages from a particular contact can be listed in the unified stack has having been sent from that contact, whether the messages are voice mail notifications, emails, text messages, etc.

In one embodiment, the messages in the unified message stack or box may be physically stored together in a storage device of WMP 102/104. In other embodiments, the physical location of the messages is irrelevant.

For instance, in one embodiment, pointers are be used to keep track of the actual messages in memory. Messages are received and stored in physical memory in any of a number of ways. For each message, regardless of protocol, an indication of the message is written to the unified message stack/box. Each indication includes a pointer to the message in memory. Each indication may also include other information about the message including an identifier of the type of message (email, text, voice, etc.), an identifier of the sender, the time and date sent and/or received, etc.

In one embodiment, icons may also be used to represent certain types of information in the unified stack, in addition to the earlier described identification of the senders/callers. For instance, an entry in the unified stack may include an icon for the type of message (email, text, etc.).

In one embodiment, support is also provided for a user to reply to any message in the unified stack/box by selecting a message and pressing a particular number on the cell phone key pay. For text messages, pressing the reply command may open a new text message addressed to the sender of the selected message. Similarly, selecting an email message and pressing the reply command may open a new email message addressed to the sender of the selected message. For a voice message, pressing reply may dial the callers phone number. In each case, the unified message function is equipped to be able to discern the appropriate communication protocol, e.g. by way of the message type. The same interface command applies for any message in the unified stack/box using any available message protocol.

In an alternative embodiment, replying to a selected message does not have to use the same message protocol as the selected message. That is, rather than automatically replying to an email with an email, the device (e.g. by way of the unified message function) may give the user the opportunity to reply with a phone call or text message. For instance, if a contact record is associated with a selected message, the contact record may list multiple communications services for that sender and give the user the opportunity to select any one of the available services with which to reply. Then, based on the service type selected, the device (e.g. by way of the unified message function) can automatically initial a message that is appropriately addressed. If a contact record is not available, but a return address or phone number is available for the selected message, the device (e.g. by way of the unified message function) may only be able to automatically initial a reply message using the same type of messaging service. But, the device (e.g. by way of the unified message function) may still give the user an opportunity to select other service types and then, if a different service type is selected, prompt the user for the appropriate address or phone number.

Uniform message interfaces could also include many other commands and features. For instance, there could be a command to delete a selected message. A delete command could be designed to merely delete an indication from the unified stack, or the command could delete both the indication of the message from the unified stack/box and the actual message itself. Another command could forward a message. In which case, a user would likely be prompted for a destination address or number. Other commands could be used to change the order of the stack based on, for instance, read/unread, chronological order, reverse chronological order, sender identification, service-type, etc. Another command to be used to open a message, or display more detailed information about a message.

Figure 4:
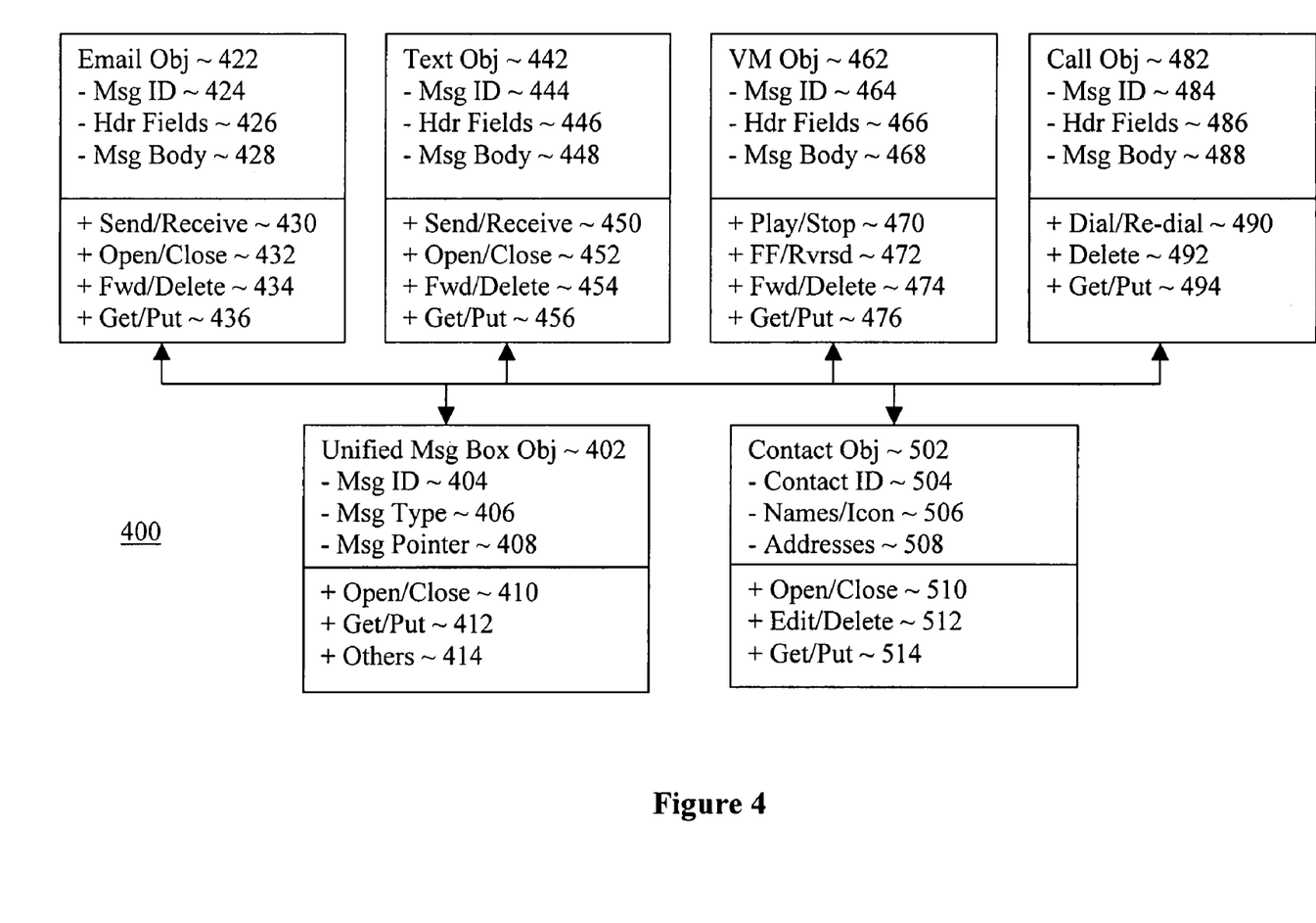
FIG. 4 illustrates one embodiment of a data structure for embodiments of the present invention.

FIG. 4 illustrates an exemplary data structure suitable for use to practice embodiments of the invention. For the embodiment, data structure 400 includes a number of email message objects 422, text message objects 442, voice message objects 462, and call message objects 482 for storing email messages, text messages, voice messages and call messages respectively.

Each email message object 422 may include e.g. message identifier 424, message header fields 426 and message body 428. Message header fields 426 may include sender identifiers, dates, times, and so forth. Each email message object 422 may also include send/receive method 430 for sending and receiving an email message, an open/close method 432 for opening and closing an email, a forward/delete method 434 for forwarding or deleting an email, and a get/put method 436 for retrieving and storing an email object.

Each text message object 442 may include e.g. message identifier 444, message header fields 446 and message body 448. Message header fields 446 may include sender identifiers, dates, times, and so forth. Each text message object 442 may also include send/receive method 450 for sending and receiving a text message, an open/close method 452 for opening and closing a text message, a forward/delete method 454 for forwarding or deleting a text message, and a get/put method 456 for retrieving and storing a text message object.

Each voice message object 462 may include e.g. message identifier 464, message header fields 466 and message body 468. Message header fields 466 may include sender identifiers, dates, times, and so forth. Each voice message object 462 may also include play/stop method 470 for playing and stop playing of a voice message, a fast forward and reverse method 472 for opening and closing a voice message, a forward/delete method 474 for forwarding or deleting a voice message, and a get/put method 476 for retrieving and storing a voice message object.

Each call message object 482 may include e.g. message identifier 484, message header fields 486 and message body 488. Message header fields 486 may include sender identifiers, dates, times, and so forth. Each call message object 482 may also include dial/re-dial method 490 for dial/re-dialing a prior call, a delete method 492 for deleting a call message, and a get/put method 494 for retrieving and storing a call message object.

In each case, alternate embodiments may have more or less fields, and/or more or less methods for the various email, text, voice and call messages.

Still referring to FIG. 4, data structure 400 also includes contact objects 502 and unified message box objects 402. Each contact object 502 may include e.g. contact identifier 504, a name and an icon of the contact 506 and addresses of the contact 508, such as phone numbers, email user identifier, IP addresses, and so forth. Each contact object 502 may also include open/close method 510 for opening or closing a contact, an edit/delete method 512 for editing and/or deleting a contact, and a get/put method 514 for retrieving and storing a contact object.

Each unified message box object 402 may include e.g. message identifier 404, a message type 406 and a pointer to the message 408, that is an email message, a text message, a voice message and a call message. Each unified message box object 402 may also include open/close method 410 for opening or closing an unified message box object, a get/put method 512 for retrieving and storing a unified message box object 412, and other methods 414.

Figure 5:
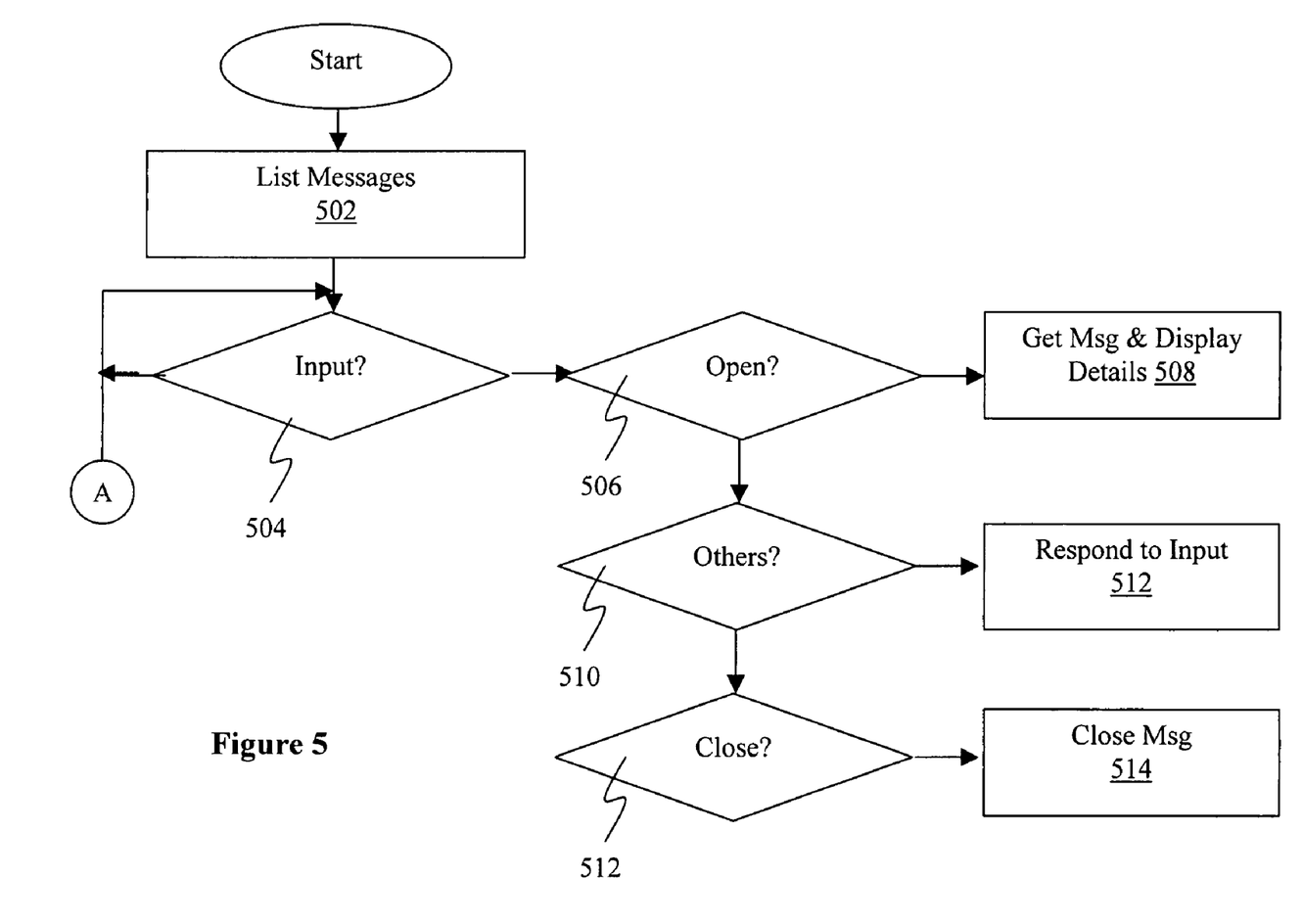
FIG. 5 illustrates one embodiment of an operational flow of an unified message function for embodiments of the present invention.

FIG. 5 illustrates an example operation flow of the unified message function of FIG. 2, in accordance with one embodiment. The embodiment assumes a WMP 102/104 sends and receives a plurality of messages in a plurality of message formats, e.g. email, text, voice, call and so forth. Further, the messages are stored in message objects of corresponding object types, and an indication of each of the plurality of messages is stored in e.g. a unified message box object of FIG. 4. As described earlier, the unified message box object may include information such as the service type, and a pointer to the message itself.

Thus, during operation, in response to a user request, e.g. inputted using the input key pad, the unified message function may list a list of the messages of the various message types 502. For the embodiment, the unified message function traverses the unified message box objects, retrieving their pointers, and in turn, using the retrieved pointers to retrieve the messages. Further, if the sender is a contact, the unified message function may also retrieve additional information about the sender from the corresponding contact object, including e.g. as described earlier, an image or icon depicting the sender. As also described earlier, if the sender is unknown, an unknown icon, such as a "?" may be displayed instead.

Upon displaying the list, the unified message box function waits for user inputs, 504. On receipt, the nature of the user input is determined, and responded to accordingly.

As illustrated, if the user input is to open a message, the message is "open" by the unified message function, providing the user with additional message details 506, as described earlier.

If the user input is to "reply", a pop up may be presented by the unified message function to facilitate the user to reply in like communication protocol (email to email, text to text and so forth) may be provided, 508, as described earlier. As described earlier, the unified message function may be equipped to ascertain the appropriate communication type, e.g. by way of the message type. Likewise, as described earlier, a pop up may be presented by the unified message function to facilitate the user to reply in another communication protocol (if supported by the sender, as determined e.g. based on the contact information) may be provided instead.

If the user input is to close a message, the message is "closed" 510 by the unified message function, accordingly.

Of course, these are just a few of the user inputs that may be supported. Alternate embodiments may support a broad range of other user manipulation of the message objects in the unified message box.

Software implementations of the embodiments of the present invention may be implemented in a wide range of machine executable instructions, including but are not limited to C. In alternate embodiments, the present invention may be implemented in discrete hardware or firmware. For example, one or more application specific integrated circuits (ASICs) could be programmed with one or more of the above described functions of the present invention. In another example, one or more functions of the present invention could be implemented in one or more ASICs on additional circuit boards and the circuit boards could be inserted into the hardware system described above. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, a unified stack/box for calls and messages for wireless mobile devices has been described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed:

1. A method comprising:
   receiving, by a wireless mobile communication device, a first user request from an input key of the wireless mobile communication device;
   in response, displaying by the wireless mobile communication device, on a display of the wireless mobile communication device, a list of communication messages of at least two message types, at least one of the two message types selected from a message type group consisting of an email message type, a text message type, a voice message type, and a call message type;

first facilitating, by the wireless mobile communication device, selection, from the displayed list of communication messages, one communication message of the displayed list; and in response to a selection of the first facilitating, second facilitating by the wireless mobile communication device, reply to the selected communication message, with the second facilitating including (1) automatically selecting a first communication protocol associated with the selected communication message to enable reply to the selected message using the first communication protocol, or (2) rendering a menu of communication protocols to enable selection of a second communication protocol for replying to the selected communication message using the second communication protocol.

2. The method of claim 1, wherein the displaying comprises displaying on the display a pictorial icon depicting a sender/caller of a communication message of the list of communication messages.

3. The method of claim 1, wherein the displaying comprises displaying on the display a pictorial icon depicting an unknown sender/caller for a communication message of the list of communication messages.

4. The method of claim 1, further comprising receiving a second user request from the same or another input key of the wireless mobile communication device; and in response, expanding the display of a selected one of the displayed communication messages.

5. The method of claim 1, wherein said displaying comprises displaying the list of communication messages with at least three message types, at least two of the message types selected from the message type group consisting of the email message type, the text message type, the voice message type, and the call message type.

6. The method of claim 1, wherein said displaying comprises displaying the list of communication messages with at least four message types comprising the email message type, the text message type, the voice message type, and the call message type.

7. The method of claim 1, wherein the first and second communication protocols are different communication protocols.

8. The method of claim 1, further comprising displaying outgoing communication messages of the at least two message types in a list of outgoing communication messages.

9. A wireless mobile communication device comprising:
a transceiver to facilitate sending and receiving communication messages of a plurality of message types;
a display;
an input device; and
an unified message function to
first render on the display, in response to a first input inputted using the input device, a list of communication messages of at least two message types, at least one of the two message types selected from a message type group consisting of an email message type, a text message type, a voice message type, and a call message type, first facilitate, by the wireless mobile communication device, selection, from the rendered list of communication messages, one communication message of the rendered list, and in response to a selection of said first facilitate, second facilitate by the wireless mobile communication device, reply to the selected communication message, with the second facilitate including (1) automatically select a first communication protocol associated with the selected communication message to enable reply to the selected message using the first communication protocol, or (2) second render a menu of communication protocols to enable selection of a second communication protocol for replying to the selected communication message using the second communication protocol.

10. The wireless mobile communication device of claim 9, wherein the unified message function is designed to display, as part of said first rendering, a pictorial icon depicting a sender/caller of a communication message of the list of communication messages.

11. The wireless mobile communication device of claim 9, wherein the unified message function is designed to display, as part of said first rendering, a pictorial icon depicting an unknown sender/caller for a communication message of the list of communication messages.

12. The wireless mobile communication device of claim 9, wherein the unified message function is further designed to expand the display of a selected one of the displayed communication messages, in response to a second input inputted from the input device.

13. The wireless mobile communication device of claim 9, wherein the unified message function is designed to render the list of communication messages with at least three message types, at least two of the message types selected from the message type group consisting of the email message type, the text message type, the voice message type, and the call message type.

14. The wireless mobile communication device of claim 9, wherein the unified message function is designed to render the list of communication messages with at least four message types comprising the email message type, the text message type, the voice message type, and the call message type.

15. The wireless mobile communication device of claim 9, wherein the wireless mobile communication device comprises a wireless mobile phone.

16. The wireless mobile communication device of claim 9, wherein the first and second communication protocols are different communication protocols.

17. The wireless mobile communication device of claim 9, wherein the unified message function is further adapted to render outgoing communication messages of the at least two message types in a list of outgoing communication messages.

* * * * *